W. B. Farrar,

Cider Press

No. 113,283.    Patented Apr. 4, 1871.

Witnesses:                    Inventor:
                              Wm. B. Farrar Scale: 3 inches to 1 foot.    Attorneys.

United States Patent Office.

WILLIAM B. FARRAR, OF GREENSBOROUGH, NORTH CAROLINA.

Letters Patent No. 113,283, dated April 4, 1871.

IMPROVEMENT IN CIDER AND WINE-MILLS.

The Schedule referred to in these Letters Patent and making part of the same.

*To all whom it may concern:*

Be it known that I, WILLIAM B. FARRAR, of Greensborough, in the county of Guilford and State of North Carolina, have invented a new and useful Improvement in Cider or Wine-Mill; and I do hereby declare the following to be a full, clear, and exact description of the same, reference being had to the accompanying drawing making a part of this specification, in which—

Figure 1:
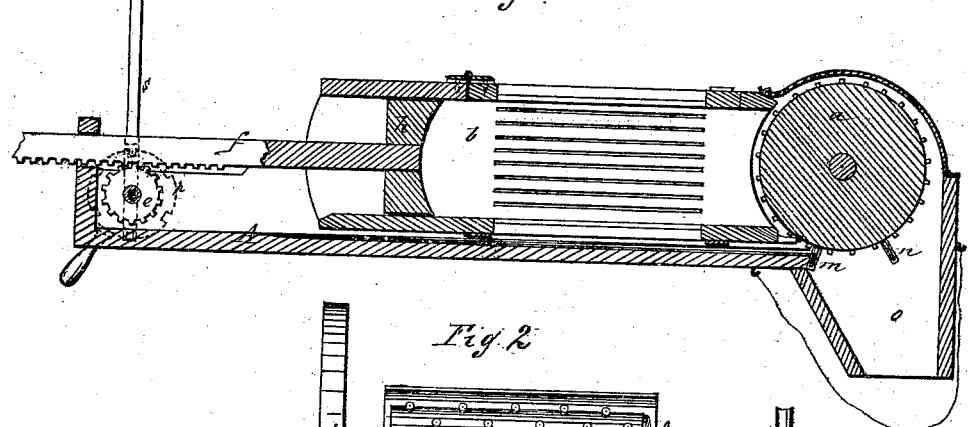
Figure 1 is a longitudinal sectional elevation.
Figure 2:
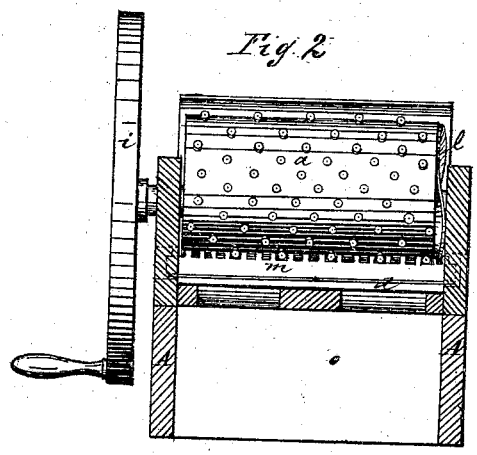
Figure 2 is an end elevation of the machine with the frame removed, showing the crushing-cylinder and combs.
Figure 3:
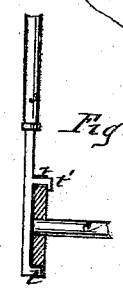
Figure 3 is a view of the lever and disk.

This invention relates to a cider or wine-mill, in which the unbroken fruit is first placed in a press-box, wherein, by the moving of the platen, it is fed up to the revolving grinding-cylinder and thereby reduced to pomace, and in which the pomace is then replaced in the same box, and, by the operation of the platen, forced again against the grinding-cylinder, which now stands still, whereby the juice is expressed from the pomace, the same box thus serving to hold the fruit both while grinding and pressing.

Referring to the drawing—

A is the press-frame.

*a* is the crushing-cylinder, placed across the frame at one end thereof, and armed with teeth placed in lines parallel with the cam-ring at the end of the cylinder.

*b* is the press-box, in the construction of which there is nothing peculiar, the same being placed in the frame A, having one end hollowed out so that it may accurately fit the crushing-cylinder, provided with a cover in its upper side for the introduction of fruit and pomace. The press-box may be moved back and forth between the crushing-cylinder and the shaft *c* that is mounted, in its rear, crosswise of the frame A.

The press-box is provided with grooves in its outer sides and at its forward end, which grooves are entered by pins that project inward from the sides of the frame A, when the press-box is drawn forward against the crushing-cylinder. By means of the pins and grooves the box is prevented from rising for any cause. Another pin passed through the side of the frame into the press-box holds the latter from moving backward.

A plate, *d*, placed crosswise of the frame A, beneath the cylinder *a*, meets the end of the press-box when the latter is drawn forward, and conducts the fruit directly to the cylinder.

Beneath the plate *d* inclined grooves are cut in the bottom of the frame A, running to the spout at the front end thereof, for conducting away the juice expressed from the pomace.

The transverse shaft *c* has a crank on one of its ends outside the frame A. On it is also placed, about at the center of the frame A, a pinion, *e*, the teeth of which engage with a rack attached to the lower side of the platen-bar *f*, which bears the platen *h* on its front extremity and passes through an orifice in the rear end of the frame A.

The platen is of proper size to traverse the press-box, and is concave at its front side, so as to fit the crushing-cylinder.

The press-box having been drawn up to the cylinder and fastened, and the platen having, by the backward rotation of the shaft *c*, been moved to the rear end of the press-box, and the latter having been filled with fruit, the machine is ready for the operation of producing pomace.

This is done by the operator turning with one hand the crank of the shaft *c*, and with the other the handle of the balance-wheel *i*, which is placed on the same shaft that bears the crushing-cylinder. As the platen is moved forward through the press-box by the action of the pinion *e* on the platen-bar, it forces the fruit against the crushing-cylinder. Attached to one end of the latter is a cam-ring, *l*, which enters one of the interstices of each of the two combs *m n*, which are mounted in suitable supports in the frame A, beneath the crushing-cylinder, parallel to the latter and to each other, and at a suitable interval apart, the teeth of which combs extend between the teeth of the crushing-cylinder nearly to the surface of the latter. The comb *m* is placed next to the front edge of the plate *d*, so that all the pomace that passes between the crushing-cylinder and said plate passes also between the crushing-cylinder and the comb *m*, and between the teeth of the latter. Both combs are made to reciprocate by the action of the cam-ring *l* as it revolves. The office of the comb *m* is to thoroughly comminute the pomace, it being obviously impossible for any piece of fruit larger than one of the interstices of said comb to pass it. The office of the comb *n* is to keep the surface of the crushing-cylinder clear of pomace. One or more of these cleaning-combs may be used. After passing the comb *m* the pomace falls through the spout *o* of the frame A into a vessel placed below to receive it, and, when the operator is ready to press it, he fills the press-box with pomace, applies a straining-cloth to the mouth of the spout *o*, and, by means of the crank, runs the platen toward the cylinder. The latter remains stationary, and forms the object against which all pressure is exerted. When more power is required than can be exerted by the crank it is gained by means of a lever applied to the shaft *c*. Through these instrumentalities the platen is forced forward and the pomace compressed between it and the crushing-cylinder. The juice expressed from the pomace pours down the grooves in the bottom of the frame A, falls upon the straining-cloth, and runs through the same into the vessel placed for its reception.

This machine is designed to be worked by hand. It is built mostly of wood, need not be above twenty-eight inches long and eight inches wide, is so light that it may be easily carried by a man, and is very simple and cheap of construction and efficient in operation, being capable of making a gallon of cider in every five minutes of actual use. It may be fastened to a table or any other place that best suits the operator.

In use the rear end of the machine is elevated so that the frame stands at an angle of twenty-five degrees, more or less. By removing the fastening-pin the press-box may be drawn back from the cylinder and taken from the frame for the purpose of discharging the pomace.

I reserve the right to use a cam of any shape, in connection with the cylinder, to govern the action of the combs.

The shaft $c$ has a serrated disk, $r$, on one end, outside the frame A.

The lever $s$, by which the final pressure is imparted to the pomace, has prongs, $t\ t$, at one side, which enter the notches of the disk, one prong at its lower end and the other at a suitable distance from the first. The upper prong $t$ has at its end a lip, $t'$, which catches on the inside of the disk as the prong is placed between any two of the teeth of the disk, and thus prevents the lever from being pulled off from the disk as it is employed to rotate the latter.

In order that none of the fruit may escape grinding, the teeth of the crushing-cylinder are placed in sinusoidal rows, which rows are parallel with the cam-ring $l$, for the purpose of enabling the teeth of the crushing-cylinder to always pass between the teeth of the combs without coming in contact with them. The combs are to be placed in working position by passing them through one side of the frame A.

Having thus described my invention,

What I claim as new, and desire to secure by Letters Patent, is—

1. The combination and arrangement of platen $h$, crushing-cylinder $a$, and press-box $b$, in such manner that the latter serves to hold the unbroken fruit during the process of grinding, and also to hold the pomace during the process of compressing, as specified.

2. The combination of the crushing-cylinder $a$, cam $l$, and combs $m$ and $n$, as described.

3. The lever $s$, provided with the prongs $t\ t$ and lip $t'$, in combination with disk $r$, as set forth.

W. B. FARRAR.

Witnesses:
   C. A. PETTIT,
   W. G. HENDERSON.